(12) United States Patent
Sendonaris

(10) Patent No.: US 6,754,254 B2
(45) Date of Patent: Jun. 22, 2004

(54) CONTROL OF TRANSIT POWER DURING OUT-OF-LOCK CONDITION

(75) Inventor: Andrew Sendonaris, San Jose, CA (US)

(73) Assignee: Qualcomm Incorporated, San Diego, CA (US)

(*) Notice: Subject to any disclaimer, the term of this patent is extended or adjusted under 35 U.S.C. 154(b) by 305 days.

(21) Appl. No.: 10/007,870

(22) Filed: Nov. 9, 2001

(65) Prior Publication Data

US 2003/0091103 A1 May 15, 2003

(51) Int. Cl.$^7$ .................... H04B 1/69; H04B 1/707; H04B 1/713
(52) U.S. Cl. .................. 375/148; 375/136; 375/147
(58) Field of Search .................. 375/148, 347, 375/130–153, 340; 370/318, 335, 320; 455/572

(56) References Cited

U.S. PATENT DOCUMENTS 5,930,288 A * 7/1999 Eberhardt ............... 375/148
6,304,563 B1 * 10/2001 Blessent et al. ........... 370/335

FOREIGN PATENT DOCUMENTS

| WO | 0167626 | 9/2001 |
|----|---------|--------|
| WO | 0167638 | 9/2001 |

* cited by examiner

Primary Examiner—Stephen Chin
Assistant Examiner—Curtis Odom
(74) Attorney, Agent, or Firm—Philip R. Wadsworth; Charles D. Brown; Timothy F. Loomis

(57) ABSTRACT

When all of the fingers of a wireless rake receiver are "out-of-lock," the transmit power is initially maintained at a constant level. When the "out-of-lock" condition persists for an extended period of time, transmit power is increased in an effort to reacquire a lock with a subscriber unit or base station, as the case may be. An increase in transmit power may be effective in reacquiring lock when the cause of the out-of-lock condition is slow fading, rather than fast fading. Slow fading may be evidenced by persistence of the out-of-lock condition for an extended period of time. The length of the out-of-lock condition is used to selectively control transmit power and thereby promote quality of service. Transmit power is only increased when the fingers remain out-of-lock for an extended period of time, thereby avoiding undue increases in transmit power that could produce interference among different subscriber units.

30 Claims, 5 Drawing Sheets

CONTROL OF TRANSIT POWER DURING OUT-OF-LOCK CONDITION

FIELD

The invention relates generally to wireless communication and, more particularly, to the control of transmit power in a spread spectrum wireless communication system.

BACKGROUND

A widely used technique for wireless communication is code division multiple access (CDMA) signal modulation. A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the WCDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005—A Upper Layer (Layer 3) Signaling Standard for cdma2000 Spread Spectrum Systems," and the "C.S0024 CDMA2000 High Rate Packet Data Air Interface Specification" (the CDMA2000 standard), and (5) other standards.

In a CDMA system, multiple communications are simultaneously transmitted between base stations and mobile subscriber units over a spread spectrum radio-frequency (RF) signal. In CDMA and other spread spectrum systems, maximizing system capacity and maintaining quality of service are paramount concerns. System capacity in a spread spectrum system can be maximized by carefully controlling the transmit power of each subscriber unit and base station in the system.

If a signal transmitted by a subscriber unit arrives at the base station at a power level that is too low, the bit-error-rate may be too high to permit effective communication with that subscriber unit, undermining quality of service. On the other hand, signals with power levels that are too high can interfere with communication between the base station and other subscriber units in the system, reducing system capacity. For this reason, to maintain system capacity and quality of service, it is desirable to optimize the level of transmit power of signals transmitted by base stations and subscriber units.

The subscriber units and base stations typically communicate with one another to control and optimize the transmit powers of signals sent in the system. For example, to control the level of transmit power in a subscriber unit, the base station estimates the power of a signal received from the subscriber unit and transmits instructions, such as power control bits, to the subscriber unit via a control channel in the downlink. The downlink is sometimes called the "forward link." Similarly, to control the level of transmit power in a base station, a subscriber unit estimates the power of a signal received from the base station and transmits power control bits to the base station via a control channel in the uplink. The uplink is sometimes called the "reverse link." In each case, the control channel may coincide with a pilot channel. The base station adjusts transmit power based on the power control bits transmitted from the subscriber unit. Likewise, the subscriber unit adjusts transmit power based on the power control bits transmitted from the base station.

SUMMARY

The invention is directed to the control of transmit power in a spread spectrum wireless communication device when all of the demodulation elements, or "fingers," of a rake receiver associated with the device are "out-of-lock." For example, the invention may be used to control the power of a signal transmitted by a base station when all of the fingers assigned to track a particular subscriber unit signal are out-of-lock. Likewise, the invention may be used to control the power of a signal transmitted by a subscriber unit when all of the fingers assigned to track a particular base station signal are out-of-lock. The invention is particularly useful in WCDMA communication systems, but may have wide application to a variety of systems.

The fingers of a rake receiver are used to track multiple received paths of a spread spectrum signal in a multi-path environment. An "out-of-lock" condition occurs when the output of a finger in the rake receiver drops below a predetermined signal strength. When all fingers are out-of-lock, the base station or subscriber unit is unable to receive the signal from the other device. Thus, power control techniques can be ineffective because the power control bits are not available for adjustment of transmit power in the receiving device. The invention applies a modified power control routine to the transmitter of a device when all of the fingers assigned to track a particular signal from another device are out-of-lock. In this manner, more effective power control in the systems can be achieved.

The out-of-lock condition may be caused by fast fading or slow fading. Fast fading may result from momentary cancellation of multipath signals, and often affects only the uplink or downlink, but not both. Slow fading may result from a large obstruction or dense array of obstructions that affect both the uplink and downlink. The uplink and downlink typically occupy different frequencies. Consequently, when there is fast fading in the uplink, the downlink is usually operable, permitting transmission of the power control bits to the "fading" device. Lock is often regained as the fading device adjusts its transmit power in response to the power control bits in the downlink. Therefore, in the case of fast fading, it is assumed that the fading device continues to receive the control channel, and is capable of responding to the power control bits to overcome the fading condition.

When the out-of-lock condition is due to slow fading, however, both the uplink and downlink may be inoperable. In other words, the fading device may be incapable of receiving the control channel from the other device, and cannot rely on power control bits for adjustment of transmit power to overcome the fading condition. In that case, if the out-of-lock condition was detected by the base station, it can be advantageous to increase the transmit power of the base station in an effort to transmit the control channel over the downlink to effect power control in the subscriber unit and thereby regain lock. The same may be true when the out-of-lock condition is detected in a subscriber unit.

The invention involves classifying an out-of-lock condition as either a fast fading condition or a slow fading condition. When the out-of-lock condition is classified as a fast fading condition, the invention maintains transmit power in the device that experienced the out-of-lock condition. When the out-of-lock condition is classified as a slow fading condition, however, the invention increases transmit power in the device that experienced the out-of-lock condition.

The invention classifies an out-of-lock condition as either a fast fading condition or a slow fading condition based on the duration of the out-of-lock condition. When all fingers are out-of-lock in the base station, for example, the base station initially assumes a fast fading condition and maintains its transmit power at a substantially constant level. When all of the fingers remain out-of-lock for an extended period of time, however, the base station assumes a slow fading condition and increases its transmit power in an effort to reacquire a lock with the signal transmitted by the subscriber unit. The invention may implement a timer, for example, to facilitate classification of out-of-lock conditions.

As transmit power is increased in the device that detects the out-of-lock condition, there is a better chance that the fading device will receive the power control bits in the control channel and increase its own transmit power. In this manner, the invention can help avoid prolonged out-of-lock conditions, and thereby promote quality of service. Transmit power is only increased when the fingers remain out-of-lock for an extended period of time, however, avoiding undue increases in transmit power that could produce interference among subscriber units.

In one embodiment, the invention provides a method comprising detecting when all demodulation fingers in a wireless rake receiver are out-of-lock, and increasing a level of transmit power of a wireless transmitter when the demodulation fingers remain out-of-lock for more than a predetermined period of time.

In another embodiment, the invention provides an apparatus having a rake receiver with demodulation fingers that receives wireless signals, a transmitter that transmits wireless signals and a detector that detects when all of the demodulation fingers in the rake receiver are out-of-lock. The invention may also include a controller that increases a level of transmit power of the transmitter when the demodulation fingers remain out-of-lock for more than a predetermined period of time.

In an added embodiment, the invention provides a method comprising detecting when all demodulation fingers in a wireless rake receiver are out-of-lock and classifying the out-of-lock detection as due to a fast fading condition or a slow fading condition in the received signal. The method may also include increasing a level of transmit power of a transmitter in the event the out-of-lock detection is classified as a slow fading condition.

In a further embodiment, the invention provides an apparatus comprising a rake receiver with demodulation fingers that receive wireless signals, a transmitter that transmits wireless signals, and a detector that detects when all demodulation fingers in the rake receiver are out-of-lock. A controller classifies the out-of-lock detection as due to a fast fading condition or a slow fading condition in the received signal. In the event the out-of-lock detection is classified as a slow fading condition, the controller increases a level of transmit power of a transmitter.

The invention can provide a number of advantages. For example, the invention can be used to increase transmit power to assist in more quickly reacquiring lock with another communication device in the case of a slow fading condition, thereby promoting quality of service for mobile subscribers. At the same time, the invention can increase transmit power on a selective basis to avoid indiscriminate increases that could create excessive interference and adversely impact system capacity. In particular, by increasing transmit power only when the out-of-lock condition appears to be the result of slow fading, the invention more effectively balances interests in both quality of service and system capacity. Accordingly, with improved management of transmit power, the invention may be effective in reducing the number of dropped users and increasing overall system capacity.

Additional details of these and other embodiments are set forth in the accompanying drawings and the description below. Other features, objects and advantages will become apparent from the description and drawings, and from the claims.

DETAILED DESCRIPTION

Figure 1:
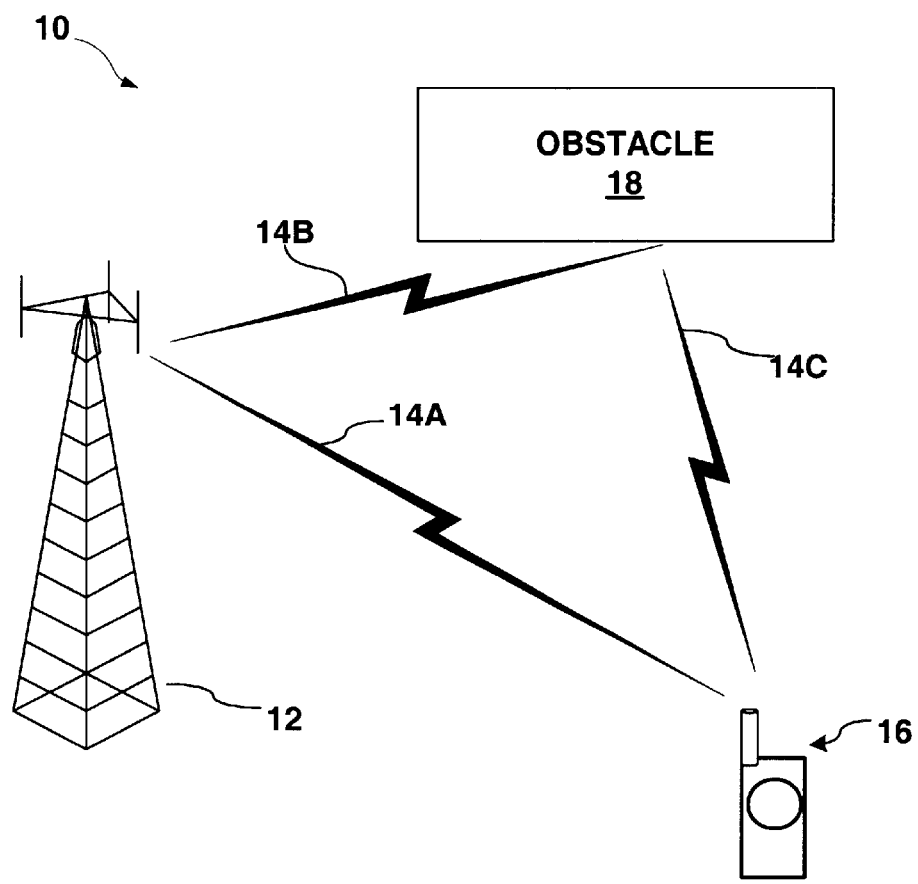
FIG. 1 is a block diagram illustrating a wireless communication system.

FIG. 1 is a block diagram illustrating a spread spectrum wireless communication system 10. System 10 may be designed to support one or more CDMA standards, including the WCDMA standard. As shown in FIG. 1, system 10 may include a base station 12 that transmits and receives signals 14 to and from a mobile subscriber unit 16 via one or more paths. Subscriber unit 16 may take the form of a cellular radiotelephone, a satellite radiotelephone, a PCMCIA card incorporated within a portable computer, a personal digital assistant (PDA) equipped with wireless communication capabilities, and the like. Base station 12 may include a base station controller (not shown) that provides an interface between the base station and a public switched telephone network.

Base station 12 may receive signal 14A from subscriber unit 16 via a first path, as well as signal 14B via a second path caused by reflection of signal 14C from an obstacle 18. Obstacle 18 may be any structure proximate to subscriber unit 16 such as a building, bridge, car, or even a person. Signals 14 illustrate a multipath environment in which multiple received signals carry the same information, but may have different amplitudes, phases and time delays. Thus, signals 14A, 14B, and 14C are instances of the same signal propagated along different physical paths to base station 12 or subscriber unit 16.

Base station 12 and subscriber unit 16 use a feedback technique to control the level of transmit power of signal 14. To control the level of transmit power in subscriber unit 16, base station 12 estimates the power of a signal received from the subscriber unit and transmits instructions, e.g., a pattern of power control bits, to the subscriber unit via a control channel in the downlink. The use of power control bits will be described herein for purposes of example. Upon receipt of the power control bits, subscriber unit 16 adjusts its transmit power so that signal 14 is received by base station 10 at an optimal power level. Similarly, to control the level of transmit power in base station 12, subscriber unit 16 estimates the power of a signal received from the base station and transmits power control bits to the base station via a control channel in the uplink. Base station 12 then adjusts its transmit power according to power control bits transmitted over the uplink.

In accordance with the invention, base station 12, subscriber unit 16, or both base station 12 and subscriber unit 16 may be configured to apply a modified power control technique when an "out-of-lock" condition exists among all paths of a received signal 14. As will be described, base station 12 and subscriber unit 16 each incorporate a rake receiver that assigns demodulation elements, or "fingers," to track multiple paths of signal 14. An "out-of-lock" condition occurs when the output of a finger in the rake receiver drops below a predetermined signal strength. When all fingers are out-of-lock, i.e., the output of every finger is below the predetermined signal strength, the base station 12 or subscriber unit 16 applies a modified power control routine in an effort to regain lock.

Figure 2:
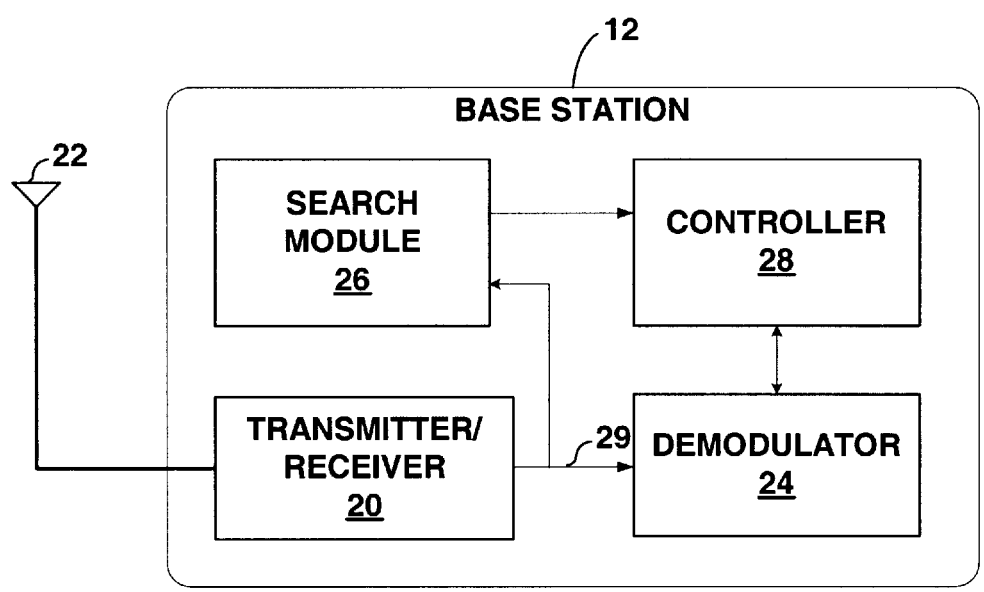
FIG. 2 is a block diagram illustrating a wireless base station.

FIG. 2 is a block diagram illustrating a wireless base station 12 in greater detail. Although base station 12 will be described for purposes of example, the structure illustrated in FIG. 2 is readily applicable to subscriber unit 16. As shown in FIG. 2, base station 12 includes a radio frequency transmitter/receiver 20 that transmits and receives wireless signals via a radio frequency antenna 22, a demodulator 24, a search module 26, and a controller 28. The functions of demodulator 24, search module 26 and controller 28 may be implemented by one or more digital signal processors (DSP), discrete hardware circuitry, firmware, field programmable gate arrays (FPGA), software executing on a programmable processor such as a DSP, or a combination of any of the above.

Antenna 22 receives incoming signals, such as CDMA modulated signals transmitted from subscriber unit 16. Transmitter/receiver 20 includes circuitry to process received signals and output baseband samples. Transmitter/receiver 20 may process the received signal using a low-noise amplifier (LNA), an RF mixer and an analog-to-digital (A/D) converter (not shown in FIG. 2) to produce corresponding digital values of the received signal, e.g., a digital baseband signal 29.

The components of base station 12 shown in FIG. 2 are configured to act as a rake receiver. In particular, to properly demodulate incoming spread spectrum signals, base station 12 uses search module 26 to continuously scan an incoming spread spectrum signal in the time domain to determine the existence, time offset, and signal strength of various received paths. Search module 26 records and reports the path information to controller 28 as search results. Local maximum energy peaks, representing received paths, appear for time offsets that result in recovery of a received signal, while other time offsets typically result in little or no signal energy. In a multipath environment, signal reflections or echoes may cause multiple energy peaks to occur.

Controller 28 uses the search results generated by search module 26 to assign fingers within demodulator 24. The fingers track and demodulate one or more of the signal paths. In this manner, base station 12 tracks multiple signal paths 14, and can combine them to produce an overall signal. For reliability, the signal strength output of a finger in demodulator 24 must exceed a predetermined signal strength threshold. If the signal strength threshold is not satisfied, the finger is determined to be "out-of-lock." When none of the assigned fingers satisfies the signal strength threshold, the entire demodulator 24 is out-of-lock with the signal it is tracking from a particular subscriber unit 16. In this case, base station 12 is unable to acquire the uplink from the subscriber unit 16, and ordinary power control is not possible.

Figure 3:
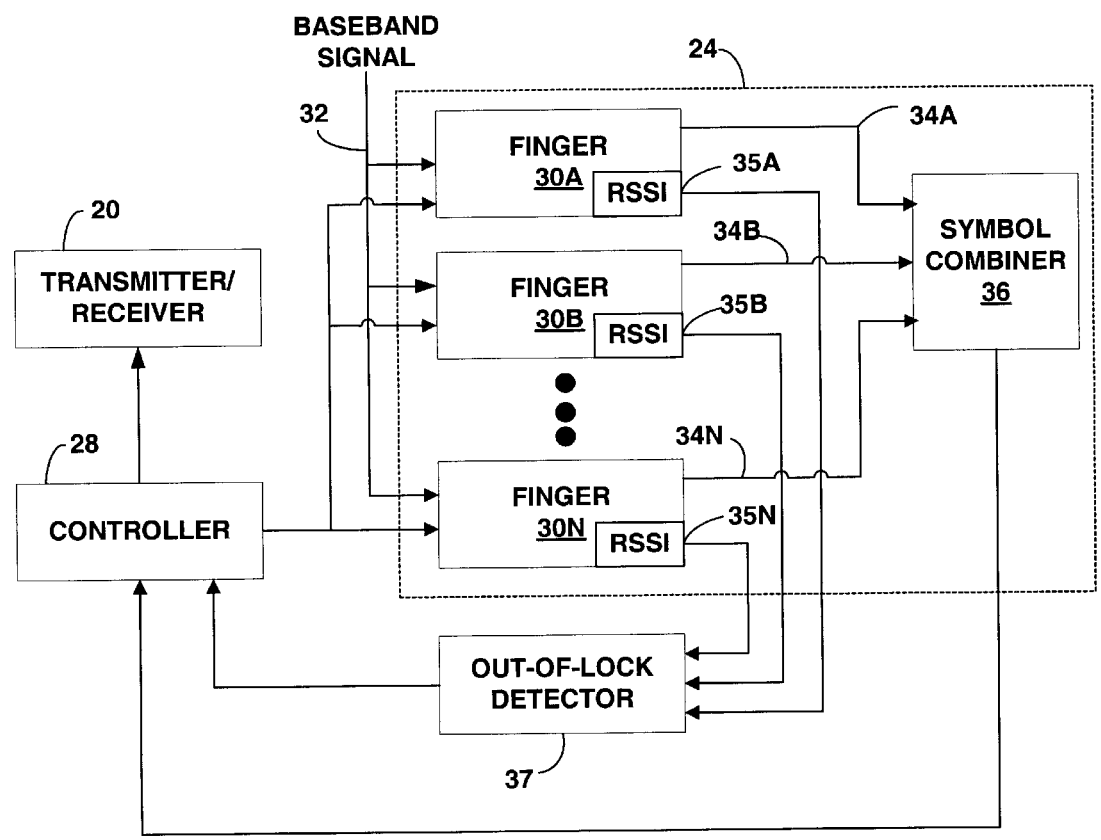
FIG. 3 is a block diagram illustrating a system for controlling transmit power.

FIG. 3 is a block diagram illustrating a system for controlling transmit power within base station 12 or subscriber unit 16. As shown in FIG. 3, demodulator 24 may assign N fingers 30A–30N, referred to collectively as fingers 30, to receive and demodulate a digital baseband signal 32. In response to timing information received from controller 28, based on search results from search module 26 (FIG. 2), fingers 30 process digital baseband signal 32 to produce soft data bits 34A–34N, collectively referred to as soft data bits 34. A symbol combiner 36 receives and combines soft data bits 34 to produce aggregate data for decoding into symbol information.

In a CDMA system, each finger 30 may include a despreader and a sequence generator that generates PN sequences according to a time offset supplied by controller 28. Consequently, the PN sequences used by the various fingers 30 may be identical to those used by the transmitting device being tracked by the respective finger 30. Each finger 30 also may include a number of components (not shown) for use in tracking and demodulating the assigned paths including filters, scaling and phase rotation circuitry, digital mixers and a Walsh sequence generator. By providing time offsets based on the search results received from search module 26 (FIG. 2), controller 28 assigns each of fingers 30 to track and demodulate one of the received paths of signal 14.

Controller 28 uses the output of symbol combiner 36 to estimate the power level of the received signal 14, and compares the power level to a target value to determine whether the received power is too high or too low. Based on this comparison, controller 28 generates a pattern of power control bits for transmission to the device that sent signal 14. This generated pattern can be used to provide power control of the device that sent signal 14. In the case of a base station 12, for example, controller 28 estimates the power of a signal 14 transmitted by a subscriber unit 16, and controls transmitter/receiver 20 to send power control bits to the subscriber unit.

In addition, controller 28 extracts from the output of symbol combiner 36 the power control bits sent with signal 14 from subscriber unit 16 for use in controlling the level of transmit power of base station 12. Based on power control bits received from one another, base station 12 and subscriber unit 16 adjust their transmit power levels. Typically, the pattern of power control bits are selected to cause an incremental, i.e., "up or down," power adjustment, such as a 0.5 decibel (dB) increase or decrease in transmit power.

When fingers 30 go "out-of-lock," base station 12 is unable to receive the power control bits from subscriber unit 16. In this case, controller 28 applies a modified power control routine. In particular, as shown in FIG. 3, an out-of-lock detector 37 monitors the output of received signal strength indicators (RSSI) 35A–35N associated with each of fingers 30A–30N. RSSI 35 may output a signal indicative of the strength of a signal received by a respective finger 30. In this case, out-of-lock detector 37 compares the signal strength output to a signal strength threshold.

Alternatively, RSSI 35 may include an internal comparator that compares the signal strength to the signal strength threshold and outputs an indication of whether the threshold is satisfied, e.g., in the form of an out-of-lock flag. In either case, out-of-lock detector 37 processes the output of RSSI 35 and notifies controller 28 when the signal strengths from all fingers 30 do not satisfy the signal strength threshold, and indicates that all fingers are therefore out-of-lock. The signal strength threshold may represent a minimum signal strength for reliable communication given background interference in the transmission environment.

As a further alternative, out-of-lock detector 37 may be configured to identify an out-of-lock condition based on the output of symbol combiner 36. When a finger 30 is out-of-lock, its output typically is not added to symbol combiner 36. In other words, the contribution of an out-of-lock finger 30 to symbol combiner 36 is zero. Accordingly, when all fingers 30 are out-of-lock, the output of symbol combiner 36 ordinarily should be zero. There is a very small probability that the contributions of a number of in-lock fingers 30 can produce a zero output from symbol combiner 36. For this reason, analysis of individual outputs of fingers 30 by out-of-lock detector 37 may be desirable. Nevertheless, analysis of the output of symbol combiner 36 is a ready alternative that should work in most cases.

If out-of-lock detector 37 notifies controller 28 that all of fingers 30 are out-of-lock, controller 28 starts a timer to track the duration of the out-of-lock condition. The out-of-lock condition may be caused by fast fading or slow fading. Fast fading may result from momentary cancellation of multipath signals, and often affects only the uplink or downlink, but not both. Slow fading may result from a large obstruction or dense array of obstructions that affect both the uplink and downlink.

In the case of fast fading of a subscriber unit 16, the downlink from base station 12 may still be operable. Accordingly, the "fading device," i.e., subscriber unit 16 in this example, may still be able to receive and respond to the power control bits generated by controller 28 on the control channel of a signal 14 transmitted by base station 12. In an out-of-lock condition, base station 12 transmits power control bits that instruct subscriber unit 16 to increase its transmit power. However, base station 12 does not immediately change its own transmit power. Instead, controller 28 initially maintains the transmit power of base station 12 at a substantially constant level in response to the out-of-lock condition. If the downlink transmission is successful, base station 12 may regain lock as subscriber unit 16 increases its transmit power in response to the power control bits in the downlink.

When the timer (or some other time tracking mechanism) indicates that the out-of-lock condition has persisted for an extended period of time, controller 28 increases the transmit power of transmitter/receiver 20 in base station 12 in an effort to regain lock with subscriber unit 16. In this case, base station 12 not only transmits power control bits requesting an increase in transmit power of subscriber unit 16, but also increases its own transmit power. Controller 28 increases transmit power independently because it is unable to receive the power control bits generated by subscriber unit 16. Hence, controller 28 attempts to distinguish between two different scenarios that can result in all fingers being out-of-lock. The two scenarios, fast fading and slow fading, require a different action by controller 28 for optimal system performance.

When the out-of-lock condition is due to slow fading, both the uplink and downlink may be inoperable. As a result, subscriber unit 16 may be unable to receive the power control bits transmitted by base station 12 on the control channel of the downlink, and cannot increase its transmit power to overcome the fading condition. In recognition of this possibility, controller 28 uses the timer to classify the out-of-lock condition as the result of either fast fading or slow fading. For a first period of time, controller 28 assumes a fast fading condition and controls base station 12 to transmit power control bits to subscriber unit 16 without increasing transmit power of the base station. After the first period of time, controller 28 assumes a slow fading condition, and controls base station 12 to transmit the power control bits and increase transmit power of the base station. In this manner, base station 12 attempts to successfully transmit the power control bits over the downlink and thereby cause subscriber unit 16 to increase its transmit power. In each case, base station 12 instructs subscriber unit 16 to increase its transmit power, but in the slow fading case the base station also increases it own transmit power.

This modified power control routine may be effective in avoiding prolonged out-of-lock conditions, and thereby promote quality of service. However, controller 28 increases transmit power in base station 12 on a selective basis. In particular, controller 28 increases transmit power only when the out-of-lock condition continues for an extended period of time. In this manner, controller 28 avoids increases in transmit power that could produce interference among subscriber units 16, and impact system capacity.

Figure 4:
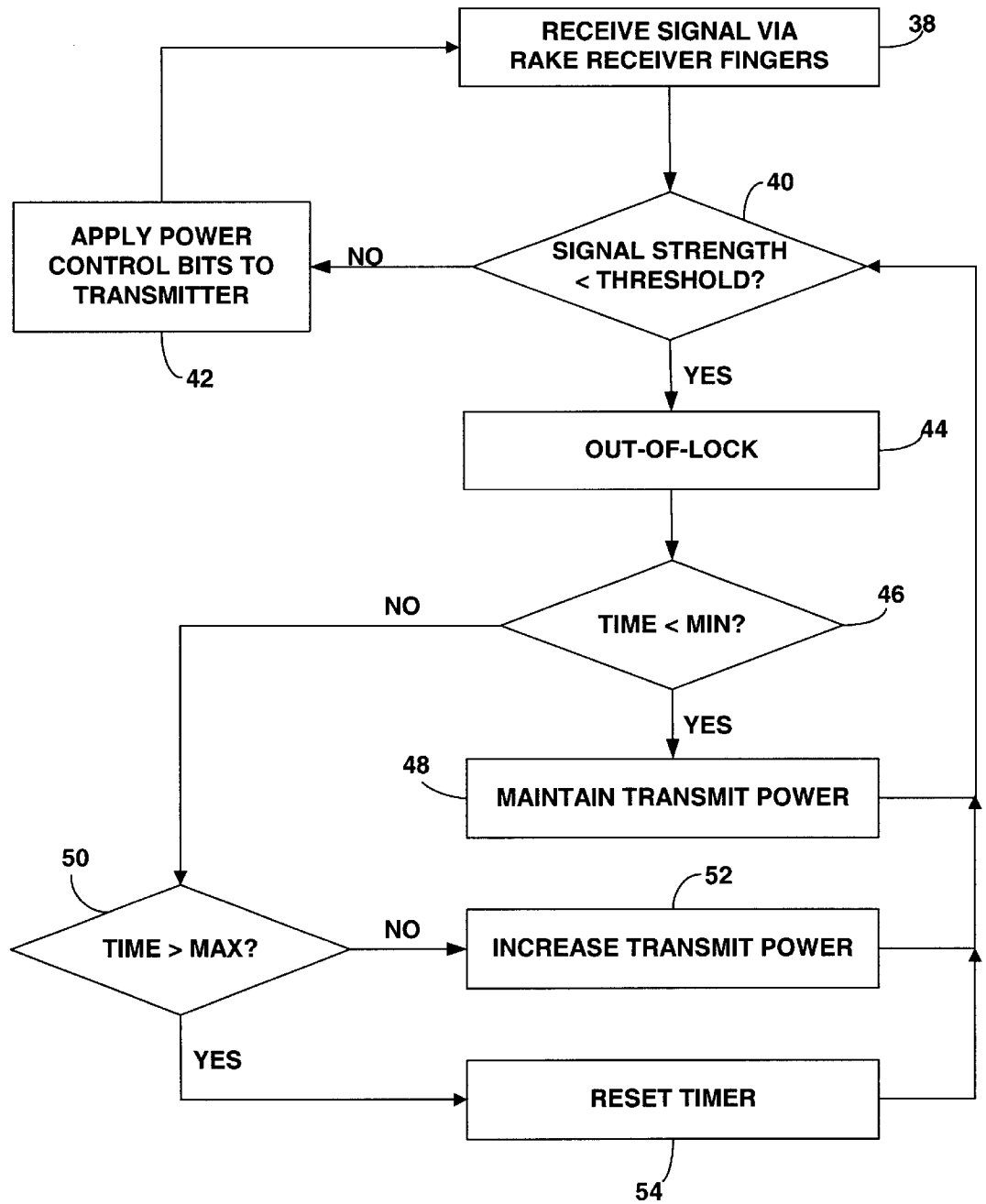
FIG. 4 is a flow diagram illustrating a process for controlling transmit power.

FIG. 4 is a flow diagram illustrating a process for controlling transmit power. As shown in FIG. 4, when a signal 14 is received via fingers 30 of demodulator 24 (FIG. 3) (38), out-of-lock detector 37 determines whether the signal strength output of all of the fingers is less than a threshold value (40). As described with reference to FIG. 3, this determination may be accomplished in a variety of ways. For example, out-of-lock detector 37 may compare the RSSI outputs of fingers 30 to a signal strength threshold. Alternatively, out-of-lock detector 37 may monitor out-of-lock flags set by RSSI circuits 35. If the signal strengths from one or more fingers 30 exceed the signal strength threshold, controller 28 extracts the power control bits from the control channel of signal 14, and applies them to control the transmit power of transmitter/receiver 20 (42) in the ordinary course.

If the signal strengths from all of fingers 30 are below the threshold, out-of-lock detector 37 indicates that all of the fingers 30 of demodulator 24 are out-of-lock (44). In this case, controller 28 cannot rely on the power control bits carried by signal 14. In response to the out-of-lock condition, controller 28 starts a timer. If the timer value is less than a minimum threshold (46), controller 28 assumes a fast fading condition in which the downlink may still be effective. In this case, controller 28 initially maintains transmit power in base station 12 (48), and then returns to process the next sample of signal 14 and compare it to the signal strength threshold (40). As an alternative to the use of a timer, controller 28 may carry out a similar timing process in other ways such as comparison of time stamps in successive signal slots and the like. Accordingly, reference to use of a timer herein should be taken broadly to represent use of any mechanism useful in tracking the duration of an out-of-lock condition.

If the timer value is greater than the minimum value, controller 28 assumes a slow fading condition. To avoid excessive increases in transmit power over an extended period of time, however, controller 28 may compare the timer value to a maximum time (50). If the timer value is greater than the minimum time (46) and less than the maximum time (50), controller 28 increases transmit power in base station 12 (52). Controller 28 then returns to process the next sample of signal 14 and compare it to the signal strength threshold (40). If the timer value is greater than the maximum time (50), controller 54 resets the timer (54).

In the event of an out-of-lock condition, controller 28 may control the transmit power of the transmitter/receiver 20 by internally generating a pattern of power control bits similar to those that would ordinarily be received on the control channel of signal 14. When controller 28 initially maintains transmit power, for example, a pattern of up/down power control bits can be selected to achieve a net gain of 0 dB/second in transmit power. When controller 28 increases transmit power, a different pattern of up/down power control bits can be selected to achieve a net gain of X dB/second in transmit power, where X is greater than zero. As an example, controller 28 could select an up/down pattern on the order of 10 dB/second when a slow fading condition exists, i.e., when the timer value has exceeded the minimum value and suggests the existence of a slow fading condition. In some embodiments, the up/down pattern may be selected as a function of the link gain associated with the particular subscriber unit 16.

Figure 5:
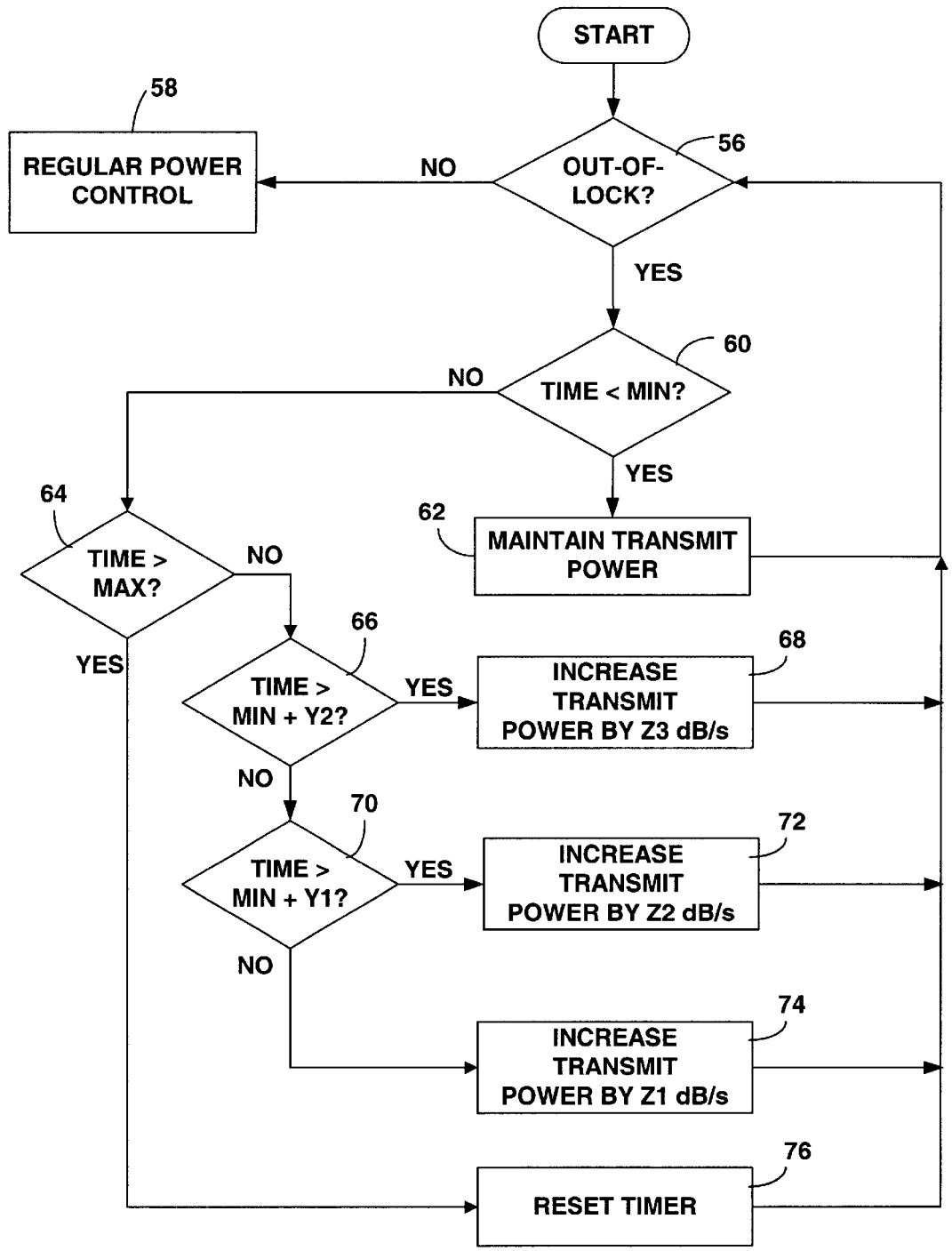
FIG. 5 is another flow diagram illustrating a process for controlling transmit power.

FIG. 5 is another flow diagram illustrating a process for controlling transmit power. In the example of FIG. 5, controller 28 is configured to incrementally increase transmit power over a period of time following detection of an out-of-lock condition. As shown in FIG. 5, when there is no out-of-lock condition (56), controller 28 applies an ordinary power control routine based on power control bits received from the signal 14 transmitted by subscriber unit 16 (58).

When an out-of-lock condition is detected (56), controller 28 sets a timer and compares the timer value to a minimum value (60), as in the example of FIG. 4. Likewise, controller 28 determines whether the timer value has exceeded a maximum time (64). If not, controller 28 commences a series of incremental increases in transmit power. For example, controller 28 may divide the duration of the out-of-lock condition into two or more sub-periods Y following the minimum time. From each sub-period to the next, controller 28 applies a different up/down pattern of power control bits to incrementally increase the transmit power at increasing rates.

If the timer value is greater than the minimum time plus Y2 sub-periods (66), controller 28 selects an up/down pattern of power control bits sufficient to increase transmit power by Z3 dB/second (68). If the timer value is greater than the minimum time plus Y1 sub-periods (70), controller 28 selects a different up/down pattern of power control bits sufficient to increase transmit power by Z2 dB/second (72). Finally, if the timer value is greater than the minimum value but less than the minimum value plus Y1 periods, controller 28 selects an up/down pattern of power control bits sufficient to increase transmit power by Z1 dB/second. In this example, Y2>Y1 and Z3>Z2>Z1. In each case, following the increase in transmit power, controller 28 returns to process the next sample of signal 14. Also, if the timer value exceeds the maximum (64), controller 28 may reset the timer (76).

According to the example of FIG. 5, controller 28 determines how long the out-of-lock condition has persisted and, based on the determination, selects one of several up/down patterns to increase transmit power. Again, if the out-of-lock condition has existed for less than the minimum time, controller 28 applies a pattern with a net gain of 0 dB/second. If the out-of-lock condition is within a first, second, or third sub-period following the minimum time, controller applies a pattern with a net gain of Z1 dB/second, Z2 dB/second, or Z3 dB/second, respectively, wherein Z1, Z2 and Z3 are increasing amounts. Notably, the incremental step increase in transmit power need not be the same for each transmit period. In this manner, when the out-of-lock condition persists, ever-increasing amounts of transmit power are used in an attempt to successfully transmit the downlink to subscriber unit 16 and regain lock with signal 14.

The times and amounts used in the modified power control routine may vary greatly. In some embodiments, the times and amounts can be selected by a service provider that administers wireless system 10. In particular, the service provider may select the times and amounts based on personal preferences, local environmental conditions, or both. In addition, the times and amounts may be modified from time-to-time as the physical environment, number of system users, or other characteristics of system 10 change over time. Significant differences may exist, for example, between urban, suburban and rural transmission environments.

As examples, however, the minimum time used to classify an out-of-lock condition as a fast fading or slow fading condition may be on the order of 20 to 50 milliseconds following the onset of the out-of-lock condition. In addition, the maximum time for which transmit power is increased may be on the order of 0.5 to 2 seconds. Thus, the period of time between the minimum and maximum times may be on the order of 0.5 to 2 seconds.

Also, in an embodiment as illustrated in FIG. 5, the period of time between the minimum and maximum times may be divided into a number of equal subperiods on the order of 5 to 15 milliseconds in duration. The sub-periods need not be periodic in the sense of being equal, regular and repetitive. Instead, the sub-periods may be unequal in duration. As an illustration, during the first sub-period, the transmit power can be increased at a rate in the range of 10 to 20 dB/second. In second and third sub-periods, for example, the transmit power can be increased at rates in the range of approximately 20 to 30 dB/second and approximately 30 to 40 dB/second, respectively.

Various embodiments of the invention have been described. In each embodiment, structure associated with control of transmit power in the event of an out-of-lock condition can be practiced within a base station or a subscriber unit, even though the description herein may refer to the perspective of only the base station for purpose of example and ease of illustration. These and other embodiments are within the scope of the following claims.

What is claimed is:

1. A method comprising:
    detecting when all demodulation fingers in a wireless rake receiver are out-of-lock; and
    increasing a level of transmit power of a wireless transmitter when all demodulation fingers remain out-of-lock for more than a predetermined period of time.

2. The method of claim 1, further comprising maintaining the level of the transmit power at a substantially constant level when the demodulation fingers remain out-of-lock for less than the predetermined period of time.

3. The method of claim 1, further comprising controlling the transmitter to transmit a signal carrying instructions to cause another device to increase transmit power when the demodulation fingers are out-of-lock, and increasing the level of transmit power of the signal when the demodulation fingers remain out-of-lock for more than a predetermined period of time.

4. A method comprising:
    detecting when all demodulation fingers in a wireless rake receiver are out-of-lock;
    increasing a level of transmit power of a wireless transmitter when all demodulation fingers remain out-of-lock for more than a predetermined period of time;
    applying a first pattern of power control bits to the transmitter to maintain the level of the transmit power when all demodulation fingers remain out-of-lock for less than the predetermined period of time; and applying a second pattern of power control bits to the transmitter to increase the level of the transmit power when all demodulation fingers remain out-of-lock for more than the predetermined period of time.

5. The method of claim 4, wherein the first pattern of power control bits produces approximately a 0 db per second increase in the level of the transmit power, and the second pattern of power control bits produces greater than or equal to approximately 10 dB per second increase in the level of the transmit power.

6. A method comprising:
    detecting when all demodulation fingers in a wireless rake receiver are out-of-lock;
    increasing a level of transmit power of a wireless transmitter when all demodulation fingers remain out-of-lock for more than a predetermined period of time;
    starting a timer in response to the detection; and
    stopping the timer when at least one of the demodulation fingers is in-lock,
    wherein increasing the level of the transmit power includes increasing the level of the transmit power when the timer runs for more than the predetermined period f time.

7. The method of claim 1, wherein the transmitter and rake receiver are both associated with a wireless base station.

8. The method of claim 1, wherein the transmitter and rake receiver are both associated with a mobile subscriber unit.

9. The method of claim 1, wherein the transmitter is a CDMA transmitter that transmits signals according to WCDMA standard.

10. The method of claim 1, further comprising increasing the level of the transmit power by an amount selected according to characteristics of a load wireless transmission environment.

11. An apparatus comprising:
    a rake receiver with demodulation fingers that receives wireless signals;
    a transmitter that transmits wireless signals;
    a detector that detects when all of the demodulation fingers in the rake receiver are out-of-lock; and
    a controller that increases a level of transmit power of the transmitter when all of the demodulation fingers remain out-of-lock for more than a predetermined period of time.

12. The apparatus of claim 11, wherein the controller maintains the level of the transmit power at a substantially constant level when the demodulation gem am out-of-lock for less than the predetermined period of time.

13. The apparatus of claim 11, wherein the controller controls the transmitter to transmit a signal carrying instructions to cause another device to increase transmit power when the demodulation fingers are out-of-lock, and increases the level of transmit power of the signal when the demodulation fingers remain out-of-lock for more than a predetermined pen of time.

14. An apparatus comprising:
    a rake receiver with demodulation fingers that receives wireless signals;
    a transmitter that transmits wireless signals;
    a detector that detects when all of the demodulation fingers in the rake receiver are out-of-lock; and
    a controller that increases a level of transmit power of the transmitted when the demodulation fingers remain out-of-lock for more than a predetermined period of time, wherein the controller
    controls the transmitter to transmit a signal carrying instructions to cause another device to increase transmit power when the demodulation fingers are out-of-lock, aid increases the level of transmit power of the signal when the demodulation fingers remain out-of-lock for more than predetermined period of time,
    applies a first pattern of power control bits to the transmitter to maintain the level of the transmit power when the demodulation fingers remain out-of-lock for less than the predetermined period of time; and
    applies a second pattern of power control bits to the transmitter to increase the level of the transmit power when the demodulation fingers remain out-of-lock for more than the predetermined period of time.

15. The apparatus of claim 14, wherein the first pattern of power control bits produces approximately a 0 db per second increase in the level of the transmit power, and the second pattern of power control bits produces greater than or equal to approximately 10 dB per second increase in the level of the transmit power.

16. An apparatus comprising:
    a rake receiver with demodulation fingers that receives wireless signals;
    a transmitter that transmits wireless signals;
    a detector that detects when all of the demodulation fingers in the rake receiver are out-of-lock;
    a controller that increases a level of transmit power of the transmitter when all of the demodulation fingers remain out-of-lock for more than a predetermined period of time; and
    a timer,
    wherein the controller starts the timer in response to the detection, stops the timer when at least one of the demodulation fingers is in-lock, and increases the level of the transmit power when the timer runs more than the predetermined period of time.

17. The apparatus of claim 11, wherein the transmitter an the rake receiver are both associated with a wireless base station.

18. The apparatus of claim 11, wherein the transmitter an the rake receiver are both associated with a mobile subscriber unit.

19. The apparatus of claim 11, wherein the transmitter is CDMA transmitter that transmits signals according to the WCDMA standard.

20. The apparatus of claim 11, wherein the controller increases the level of the transmit power by an amount selected according to characteristics of a local wireless transmission environment.

21. A method comprising:
    detecting when all demodulation fingers in a wireless rake receiver out-of-lock;
    classifying the out-of-lock detection as due to a fast fading condition or a slow fading condition in the received signal; and
    increasing a level of transmit power of a transmitter in the event the out-of-lock detection is classified as a slow fading condition.

22. The method of claim 21, further comprising classify the out-of-lock detection as due to a slow fading condition when the fingers remain our-of-lock for more than a predetermined period of time.

23. The method of claim 21, wherein the transmitter and the rake receiver are both associated with a wireless base station.

24. The method of claim 21, wherein the transmitter and the rake receiver are both associated with a mobile subscriber unit.

25. The method of claim 16, wherein the transmitter is a CDMA transmitter that transmits signals according to the WCDMA standard.

26. An apparatus comprising:
- a rake receiver with demodulation fingers that receive wireless signals;
- a transmitter that transmits wireless signals;
- a detector that detects when all demodulation fingers in the rake receiver are a t-of-lock; and
- a controller that classifies the out-of-lock detection as due to a fast fading condition or a slow fading condition in the received signal, and increases a level of trans power of a transmitter in the event the our-of-lock detection is classified as a slow fading condition.

27. The apparatus of claim 26, wherein the controller classifies the out-of-lock detection as due to a slow fading condition when the fingers remain out-of-lock for more than a predetermined period of time.

28. The apparatus of claim 26, wherein the transmitter an the rake receiver are both associated with a wireless base station.

29. The apparatus of claim 26, wherein the transmitter an the rake receiver are both associated with a mobile subscriber unit.

30. The apparatus of claim 26, wherein the transmitter is CDMA transmitter that transmits signals according to the WCDMA standard.

* * * * *

UNITED STATES PATENT AND TRADEMARK OFFICE
CERTIFICATE OF CORRECTION

PATENT NO. : 6,754,254 B2
DATED : June 22, 2004
INVENTOR(S) : Andrew Sendonaris

Page 1 of 1

It is certified that error appears in the above-identified patent and that said Letters Patent is hereby corrected as shown below:

<u>Column 11,</u>
Line 36, change "load" to -- local --.
Line 50, change "demodulation gem am out-of-lock" to -- demodulation fingers remain out-of-lock --.

Signed and Sealed this

Eleventh Day of April, 2006

JON W. DUDAS
*Director of the United States Patent and Trademark Office*